(12) United States Patent  
Kurumatani et al.

(10) Patent No.: US 7,187,516 B2  
(45) Date of Patent: Mar. 6, 2007

(54) MAGNETIC RECORDING AND REPRODUCTION APPARATUS

(75) Inventors: Hiroshi Kurumatani, Hyogo (JP); Toshiaki Ueta, Tokushima (JP); Koichiro Hirabayashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 438 days.

(21) Appl. No.: 10/812,825

(22) Filed: Mar. 30, 2004

(65) Prior Publication Data

US 2004/0207950 A1   Oct. 21, 2004

(30) Foreign Application Priority Data

Mar. 31, 2003   (JP)   .............................. 2003-094934

(51) Int. Cl.  
    G11B 5/027      (2006.01)

(52) U.S. Cl. ...................................................... 360/85
(58) Field of Classification Search ................. 360/85, 360/92–94  
See application file for complete search history.

(56) References Cited

U.S. PATENT DOCUMENTS 5,526,210 A * 6/1996 Murayama ................. 360/132  
5,535,071 A * 7/1996 Yamagishi et al. ........ 360/96.5  
6,157,512 A * 12/2000 Matsuoka et al. ............ 360/85

* cited by examiner

*Primary Examiner*—Angel Castro  
*Assistant Examiner*—Christopher R. Magee  
(74) *Attorney, Agent, or Firm*—Renner, Otto, Boisselle & Sklar, LLP

(57) ABSTRACT

A magnetic recording and reproduction apparatus includes a main chassis; a sub chassis on which a cassette is mountable, the sub chassis being movable relative to the main chassis; and a first guide section for guiding the sub chassis to move relative to the main chassis. The first guide section includes a first guide groove; and a first projection engageable with the first guide groove and movable along the first guide groove. The first guide groove has two ends, the first projection is contactable with at least one of the two ends at two points and the at least one end is formed such that the movement of the first projection toward the at least one end is stopped by the contact with the two points, and the two points have a distance therebetween which is shorter than a width of the first guide groove.

4 Claims, 11 Drawing Sheets

FIG.13 CONVENTIONAL ART
(a)
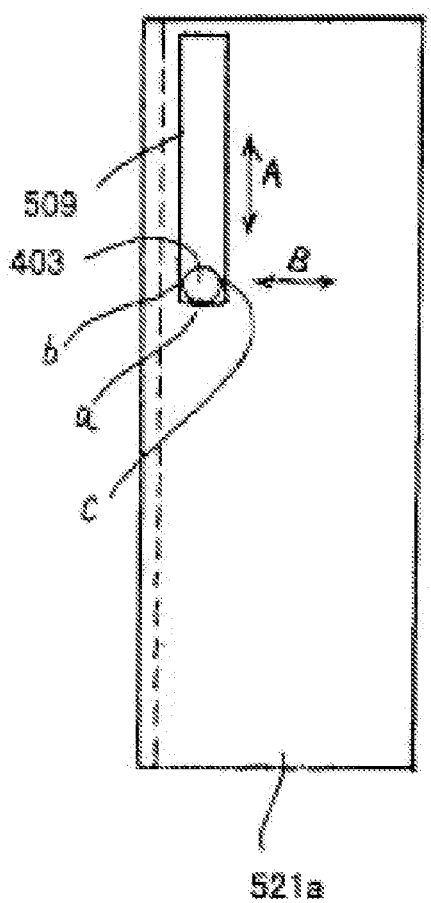
(b)
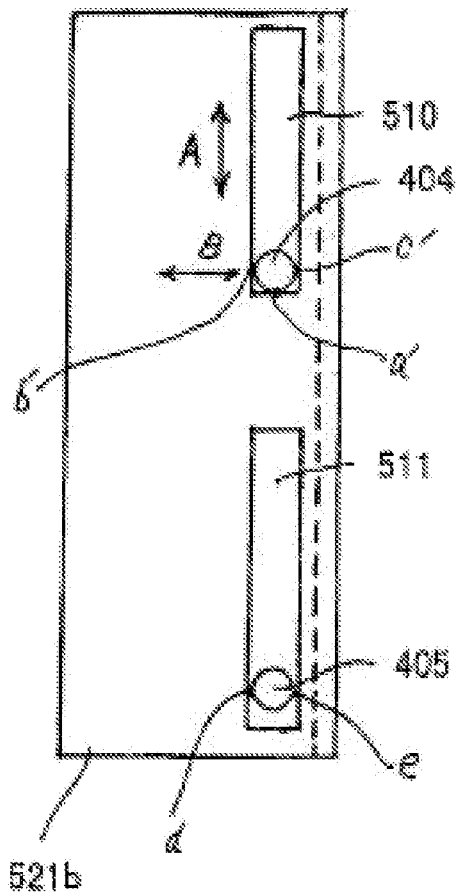

MAGNETIC RECORDING AND REPRODUCTION APPARATUS

This non-provisional application claims priority under 35 U.S.C., §119(a), on Patent Application No. 2003-094934 filed in Japan on Mar. 31, 2003, the entire contents of which are hereby incorporated by reference.

BACKGROUND OF THE INVENTION

1. Field of the Invention

The present invention relates to a magnetic recording and reproduction apparatus, and in particular, to a magnetic recording and reproduction apparatus in which a sub chassis is movable relative to a main chassis.

2. Description of the Related Art

A magnetic recording and reproduction apparatus for recording information to, and/or reproducing information from a magnetic tape accommodated in a cassette includes two chassis, i.e., a main chassis and a sub chassis.

With reference to FIGS. 10, 11, 12 and 13, a conventional magnetic recording and reproduction apparatus 600 will be described.

In FIG. 10, part (a) is a left side view of a main chassis 400 of the magnetic recording and reproduction apparatus 600, part (b) is a plan view thereof, and part (c) is a right side view thereof.

The main chassis 400 includes a bottom portion 430, a left side section 420a vertical to the bottom section 430, and a right side section 420b vertical to the bottom section 430. The left side section 420a faces the right side section 420b.

On the bottom section 430 of the main chassis 400, a rotatable head cylinder 412 is provided.

The left side section 420a of the main chassis 400 has a first projection 403 projecting therefrom inward into the main chassis 400, and the right vertical section 420b of the main chassis 400 has a second projection 404 and a third projection 405 both projecting therefrom inward into the main chassis 400.

In FIG. 10, elements other than the rotatable head cylinder 412, the first projection 403, the second projection 404 and the third projection 405 are omitted for the sake of simplicity.

In FIG. 11, part (a) is a left side view of a sub chassis 500 of the magnetic recording and reproduction apparatus 600, part (b) is a plan view thereof, and part (c) is a right side view thereof.

The sub chassis 500 includes a bottom section 531, a left side section 521a vertical to the bottom section 531, and a right vertical section 521b vertical to the bottom section 531. The left side section 521a faces the right vertical section 521b.

The left side section 521a of the sub chassis 500 has a first guide groove 509 formed therein, and the right vertical section 521b of the sub chassis 500 has a second guide groove 510 and a third guide groove 511 both formed therein.

In FIG. 11 also, elements other than the first guide groove 509, the second guide groove 510, and the third guide groove 511 are omitted for the sake of simplicity.

The magnetic recording and reproduction apparatus 600 (FIGS. 12 and 13) are produced by placing the sub chassis 500 on the main chassis 400.

A cassette (not shown) is mounted on the sub chassis 500 of the magnetic recording and reproduction apparatus 600.

The sub chassis 500 is reciprocally movable relative to the main chassis 400 from a cassette mountable position at which the cassette is mountable on the sub chassis 500 to a tape pull-out position at which a tape in the cassette has been pulled out from a cassette to the rotatable head cylinder 412.

In the magnetic recording and reproduction apparatus 600, the first projection 403 provided on the main chassis 400 is engaged with the first guide groove 509 provided in the sub chassis 500. The second projection 404 provided on the main chassis 400 is engaged with the second guide groove 510 provided in the sub chassis 500. The third projection 405 provided on the main chassis 400 is engaged with the third guide groove 511 provided in the sub chassis 500.

Although omitted in FIGS. 10 and 11, the main chassis 400 and the sub chassis 500 are equipped with a tape pull-out member for pulling out the tape from the cassette and winding the tape around the rotatable head cylinder 412, a tape driving member for driving the tape wound around the rotatable head cylinder 412 and the like.

In FIG. 12, part (a) is a left side view of the conventional magnetic recording and reproduction apparatus 600, and part (b) is a right side view thereof, both at the cassette mountable position.

The sub chassis 500 and the main chassis 400 are engaged with each other. FIG. 12 shows the first projection 403, the second projection 404 and the third projection 405 as components provided on the main chassis 400. The entirety of the main chassis 400 is not shown.

As shown in part (a) of FIG. 12, at the cassette mountable position, the first projection 403 is contactable with the first guide groove 509 at three points a, b and c. The first projection 403 is positioned in both a moving direction represented by arrow A and a vertical direction represented by arrow B.

As shown in part (b) of FIG. 12, the second projection 404 is contactable with the second guide groove 510 at three points a', b' and c'. The second projection 404 is positioned in both the moving direction represented by arrow A and a vertical direction represented by arrow B.

As shown in part (b) of FIG. 12, the third projection 405 is contactable with the third guide groove 511 at two points d and e. The third projection 405 is positioned in the vertical direction represented by arrow B.

At the cassette mountable position, the tilt precision of the sub chassis 500 with respect to the main chassis 400 and the positional precision of the sub chassis 500 in the moving direction of arrow A with respect to the main chassis 400 are determined by the engagement of the first projection 403 and the first guide groove 509, the engagement of the second projection 404 and the second guide groove 510, and the engagement of the third projection 405 and the third guide groove 511.

In FIG. 13, part (a) is a left side view of the conventional magnetic recording and reproduction apparatus 600, and part (b) is a right side view thereof, both at the tape pull-out position.

The sub chassis 500 and the main chassis 400 are engaged with each other. FIG. 13 shows the first projection 403, the second projection 404 and the third projection 405 as components provided on the main chassis 400. The entirety of the main chassis 400 is not shown.

As shown in part (a) of FIG. 13, at the tape pull-out position, the first projection 403 is contactable with the first guide groove 509 at three points a, b and c. The first projection 403 is positioned in both the moving direction represented by arrow A and the vertical direction represented by arrow B.

As shown in part (b) of FIG. 13, the second projection 404 is contactable with the second guide groove 510 at three points a', b' and c'. The second projection 404 is positioned in both the moving direction represented by arrow A and the vertical direction represented by arrow B.

As shown in part (b) of FIG. 13, the third projection 405 is contactable with the second guide groove 511 at two points d and e. The second projection 405 is positioned in the vertical direction of arrow B.

At the tape pull-out position also, the tilt precision of the sub chassis 500 with respect to the main chassis 400 and the positional precision of the sub chassis 500 in the moving direction of arrow A with respect to the main chassis 400 are determined by the engagement of the first projection 403 and the first guide groove 509, the engagement of the second projection 404 and the second guide groove 510, and the engagement of the third projection 405 and the third guide groove 511.

The above-described conventional magnetic recording and reproduction apparatus 600 have the following problems.

In order to allow the first projection 403 to move along the first guide groove 509, the width of the first guide groove 509 in the vertical direction needs to be slightly larger than the outer diameter of the first projection 403 in the vertical direction. Due to that size difference, the position of the first projection 403 in the vertical direction is not accurately determined with respect to the first guide groove 509.

Similarly, in order to allow the second projection 404 to move along the second guide groove 510, the width of the second guide groove 510 in the vertical direction needs to be slightly larger than the outer diameter of the second projection 404 in the vertical direction. Due to that size difference, the position of the second projection 404 in the vertical direction is not accurately determined with respect to the second guide groove 510.

In general, a plurality of tape guide members for guiding the tape are provided on the sub chassis 500. The tilt and position of these tape guide members need to be positioned with high precision with respect to the rotatable head cylinder 412 provided on the main chassis 400, at the tape pull-out position. Unless the position of the first projection 403 and the second projection 404 in the vertical direction is accurately determined, the angle and position of the sub chassis 500 with respect to the main chassis 400 cannot be determined. In consequence, the tilt and position of the tape guide members cannot be determined with high precision.

The position of the sub chassis 500 in the width direction (i.e., the direction from the left side section 521a and the right vertical section 521b or vice versa) is determined by the left side section 420a and the right vertical section 420b of the main chassis 400 and the left side section 521a and the right vertical section 521b of the sub chassis 500. Therefore, the position of the sub chassis 500 in the width direction cannot be determined with high precision.

SUMMARY OF THE INVENTION

The present invention provides a magnetic recording and reproduction apparatus for recording information to, and/or reproducing information from, a magnetic tape accommodated in a cassette. The magnetic recording and reproduction apparatus includes a main chassis on which a rotatable head cylinder for recording information to, and/or reproducing information from, the magnetic tape is mounted; a sub chassis on which the cassette is mountable, the sub chassis being movable relative to the main chassis; and a first guide section for guiding the sub chassis to move relative to the main chassis. The first guide section includes a first guide groove provided in one of the main chassis and the sub chassis, the first guide groove extending in a direction in which the sub chassis is movable relative to the main chassis; and a first projection provided on the other of the main chassis and the sub chassis, the first projection being engageable with the first guide groove and movable along the first guide groove. The first guide groove has two ends between which the first projection is movable, the first projection is contactable with at least one of the two ends at two points and the at least one end is formed such that the movement of the first projection toward the at least one end is stopped by the contact with the two points, and the two points have a distance therebetween which is shorter than a width of the first guide groove in a direction perpendicular to the direction in which the sub chassis is movable.

Thus, the sub chassis can be positioned with respect to the main chassis with high precision by a simple structure.

In one embodiment of the invention, the magnetic recording and reproduction apparatus further includes a second guide section for guiding the sub chassis to move relative to the main chassis; a third guide section for guiding the sub chassis to move relative to the main chassis. The second guide section includes a second guide groove provided in one of the main chassis and the sub chassis, the second guide groove extending in the direction in which the sub chassis is movable relative to the main chassis; and a second projection provided on the other of the main chassis and the sub chassis, the second projection being engageable with the second guide groove and movable along the second guide groove. The third guide section includes a third guide groove provided in one of the main chassis and the sub chassis, the third guide groove extending in the direction in which the sub chassis is movable relative to the main chassis; and a third projection provided on the other of the main chassis and the sub chassis, the third projection being engageable with the third guide groove and movable along the third guide groove. The main chassis includes a bottom section, a first side section vertical to the bottom section, and a second side section vertical to the bottom section and facing the first side section. The sub chassis includes a bottom section, a first side section vertical to the bottom section, and a second side section vertical to the bottom section and facing the first side section. The first guide section is provided on the first side sections of the main chassis and the sub chassis. The second guide section and the third guide section are each provided on the second side sections of the main chassis and the sub chassis. The second guide groove has two ends between which the second projection is movable, the second projection is contactable with at least one of the two ends at two points and the at least one end is formed such that the movement of the second projection toward the at least one end is stopped by the contact with the two points, and the two points have a distance therebetween which is shorter than a width of the second guide groove in a direction perpendicular to the direction in which the sub chassis is movable.

Thus, the tilt of the sub chassis can be determined with high precision by the first guide section, the second guide section and the third guide section.

In one embodiment of the invention, the magnetic recording and reproduction apparatus further includes a fourth guide section for guiding the sub chassis to move relative to the main chassis; and a fifth guide section for guiding the sub chassis to move relative to the main chassis. The fourth guide section includes a fourth guide groove provided in one of the main chassis and the sub chassis, the fourth guide groove extending in the direction in which the sub chassis is movable relative to the main chassis; and a fourth projection provided on the other of the main chassis and the sub chassis, the fourth projection being engageable with the fourth guide groove and movable along the fourth guide groove. The fifth guide section includes a fifth guide groove provided in one of the main chassis and the sub chassis, the fifth guide groove extending in the direction in which the sub chassis is movable relative to the main chassis; and a fifth projection provided on the other of the main chassis and the sub chassis, the fifth projection being engageable with the fifth guide groove and movable along the fifth guide groove. The fourth guide section and the fifth guide section are each provided on the bottom sections of the main chassis and the sub chassis.

Thus, the sub chassis can be positioned with respect to the main chassis in the width direction by the fourth guide section and the fifth guide section.

In one embodiment of the invention, at least one of the two ends of the first guide groove is V-shaped.

Thus, the sub chassis can be positioned with respect to the main chassis with high precision by a simple structure.

Thus, the invention described herein makes possible the advantages of providing a magnetic recording and reproduction apparatus in which a sub chassis is positioned with respect to a main chassis with a simple structure with high precision.

These and other advantages of the present invention will become apparent to those skilled in the art upon reading and understanding the following detailed description with reference to the accompanying figures.

BRIEF DESCRIPTION OF THE DRAWINGS

FIG. 13 shows a left side view and a right side view of the conventional magnetic recording and reproduction apparatus at the tape pull-out position.

DESCRIPTION OF THE PREFERRED EMBODIMENTS

Hereinafter, the present invention will be described by way of illustrative examples with reference to the attached drawings.

A magnetic recording and reproduction apparatus according to the present invention includes a main chassis and a sub chassis and allows a cassette to be mounted thereon. The magnetic recording and reproduction apparatus records information on a magnetic tape contained in the cassette and/or reproduces information from the magnetic tape.

With reference to FIGS. 1 through 9, a magnetic recording and reproduction apparatus 300 according to one example of the present invention will be described.

Figure 1:
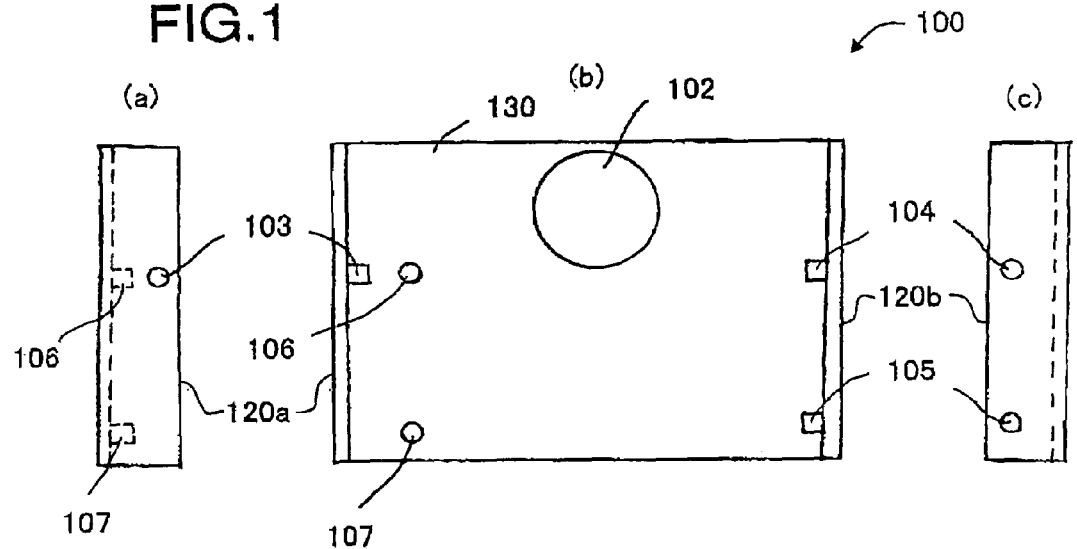
FIG. 1 shows a left side view, a plan view, and a right side view of a main chassis of a magnetic recording and reproduction apparatus in one example according to the present invention.

In FIG. 1, part (a) is a left side view of a main chassis 100 of the magnetic recording and reproduction apparatus 300, part (b) is a plan view thereof, and part (c) is a right side view thereof.

The main chassis 100 includes a bottom section 130, a left side section 120*a* vertical to the bottom section 130, and a right vertical section 120*b* vertical to the bottom section 130. The left side section 120*a* faces the right vertical section 120*b*.

On the bottom section 130 of the main chassis 100, a rotatable head cylinder 102 is provided.

The left side section 120*a* of the main chassis 100 has a first projection 103 projecting therefrom inward into the main chassis 100, and the right vertical section 120*b* of the main chassis 100 has a second projection 104 and a third projection 105 both projecting therefrom inward into the main chassis 100.

The first projection 103 faces the second projection 104.

The bottom section 130 of the main chassis 100 has a fourth projection 106 and a fifth projection 107 projecting therefrom upward.

The first projection 103, the second projection 104, the third projection 105, the fourth projection 106 and the fifth projection 107 have a circular cross-section.

In FIG. 1, elements other than the rotatable head cylinder 102, the first projection 103, the second projection 104, the third projection 105, the fourth projection 106, and the fifth third projection 107 are omitted for the sake of simplicity.

Figure 2:
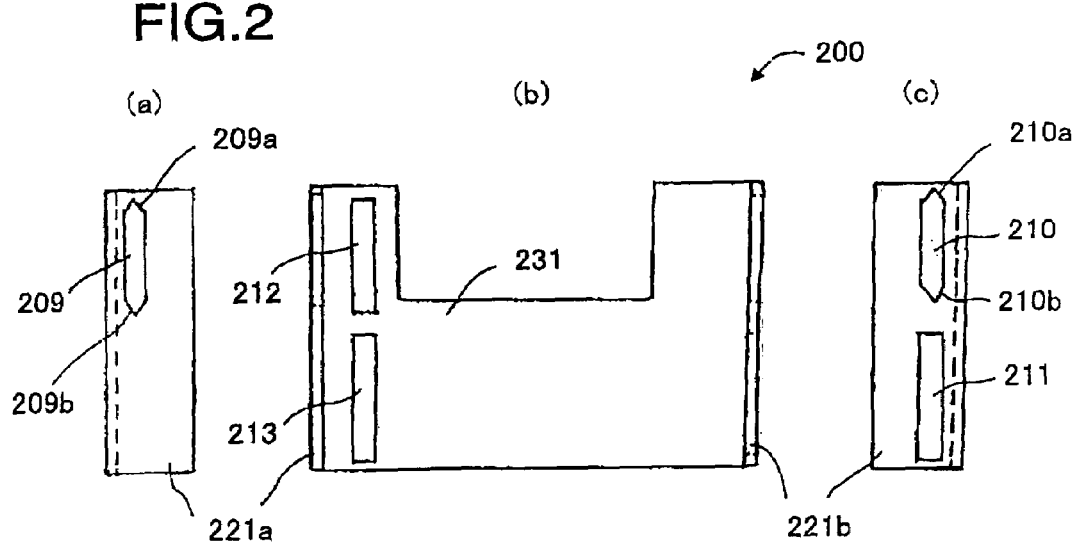
FIG. 2 shows a left side view, a plan view, and a right side view of a sub chassis of the magnetic recording and reproduction apparatus in one example according to the present invention.

In FIG. 2, part (a) is a left side view of a sub chassis 200 of the magnetic recording and reproduction apparatus 300, part (b) is a plan view thereof, and part (c) is a right side view thereof.

The sub chassis 200 includes a bottom section 231, a left side section 221*a* vertical to the bottom section 231, and a right vertical section 221*b* vertical to the bottom section 231. The left side section 221*a* faces the right vertical section 221*b*.

The left side section 221*a* of the sub chassis 200 has a first guide groove 209 formed therein, and the right vertical section 221b of the sub chassis 200 has a second guide groove 210 and a third guide groove 211 both formed therein.

The first guide groove 209 faces the second guide groove 210.

The first guide groove 209 has two ends, i.e., a first end 209a and a second end 209b, between which the first projection 103 is movable. The first end 209a and the second end 209b are V-shaped.

Similarly, the second guide groove 210 has two ends, i.e., a first end 210a and a second end 210b, between which the second projection 104 to movable. The first end 210a and the second end 210b are V-shaped.

The bottom section 231 of the sub chassis 200 has a fourth guide groove 212 and a fifth guide groove 213 formed therein.

In FIG. 2 also, elements other than the first guide groove 209, the second guide groove 210, the third guide groove 211, the fourth guide groove 212 and the fifth guide groove 213 are omitted for the sake of simplicity.

The magnetic recording and reproduction apparatus 300 (FIGS. 3 through 6 and 9) are produced by placing the sub chassis 200 on the main chassis 100.

A cassette 39 (FIG. 9) is mounted on the sub chassis 200.

The sub chassis 200 is reciprocally movable relative to the main chassis 100 from a cassette mountable position at which the cassette 39 is mountable on the sub chassis 200 to a tape pull-out position at which a tape in the cassette 39 has been pulled out from the cassette 39 to the rotatable head cylinder 102.

In the magnetic recording and reproduction apparatus 300, the first projection 103 provided on the main chassis 100 is engaged with the first guide groove 209 provided in the sub chassis 200. The second projection 104 provided on the main chassis 100 is engaged with the second guide groove 210 provided in the sub chassis 200. The third projection 105 provided on the main chassis 100 is engaged with the third guide groove 211 provided in the sub chassis 200.

Figure 4:
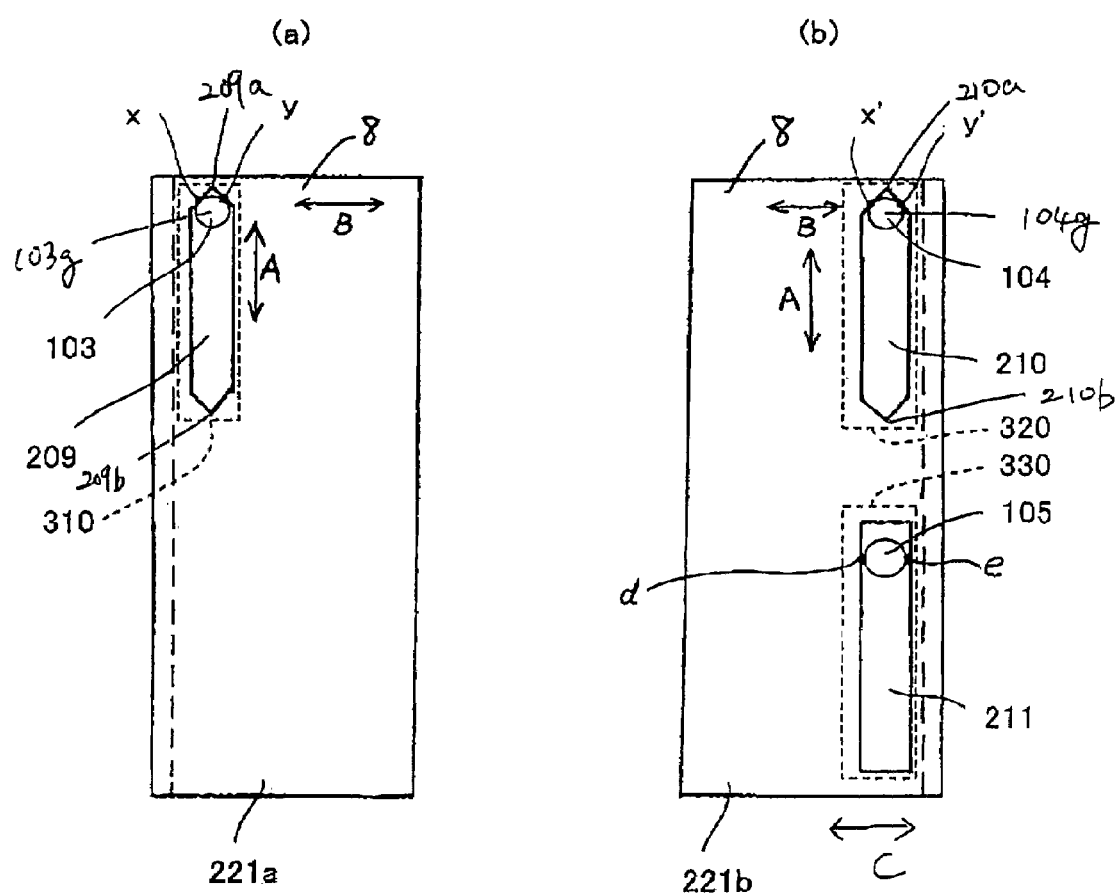
FIG. 4 shows a left side view and a right side view of the magnetic recording and reproduction apparatus in one example according to the present invention at the cassette mountable position.
Figure 6:
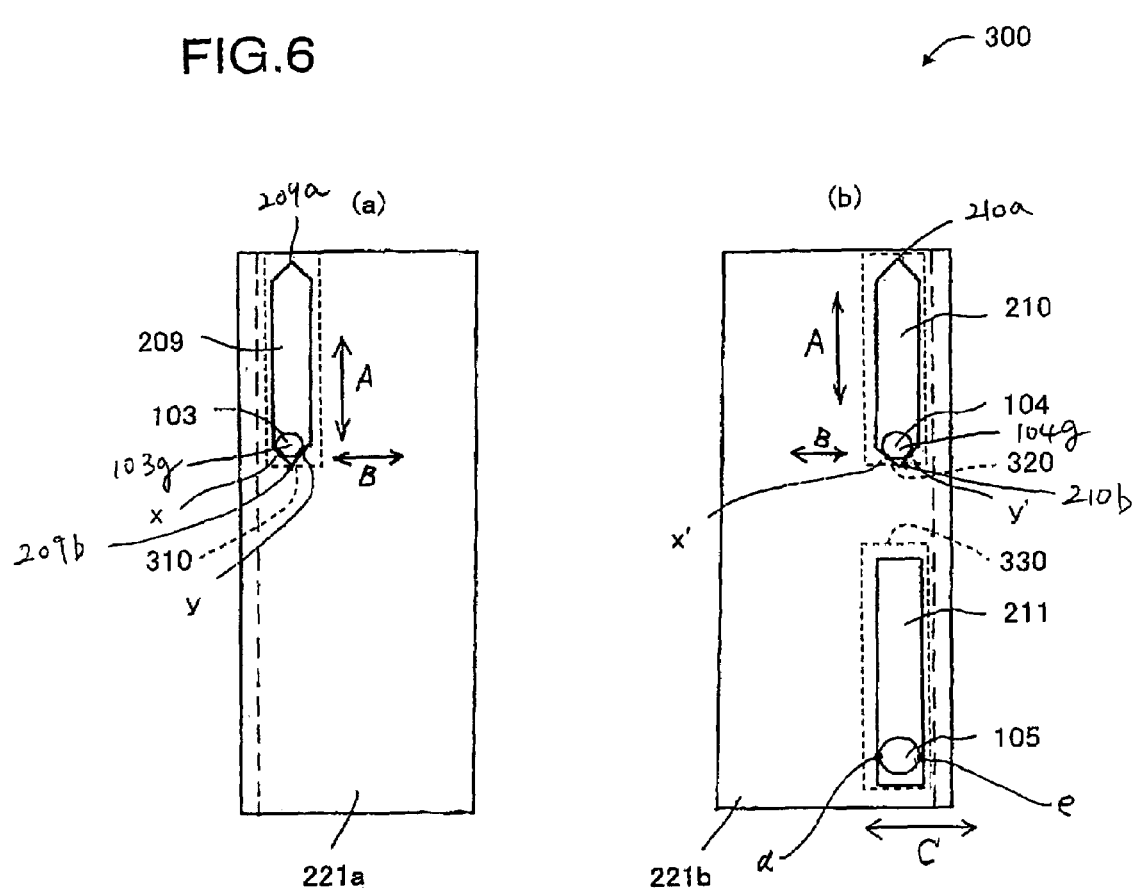
FIG. 6 shows a left side view and a right side view of the magnetic recording and reproduction apparatus in one example according to the present invention at the tape pull-out position.

The magnetic recording and reproduction apparatus 300 includes a first guide section 310 which includes the first projection 103 and the first guide groove 209, a second guide section 320 which includes the second projection 104 and the second guide groove 210, and a third guide section 330 which includes the third projection 105 and the third guide groove 211 (see FIGS. 4 and 6).

The fourth projection 106 provided on the main chassis 100 is engaged with the fourth guide groove 212 provided in the sub chassis 200, and the firth projection 107 provided on the main chassis 100 is engaged with the fifth guide groove 213 provided in the sub chassis 200.

Figure 3:
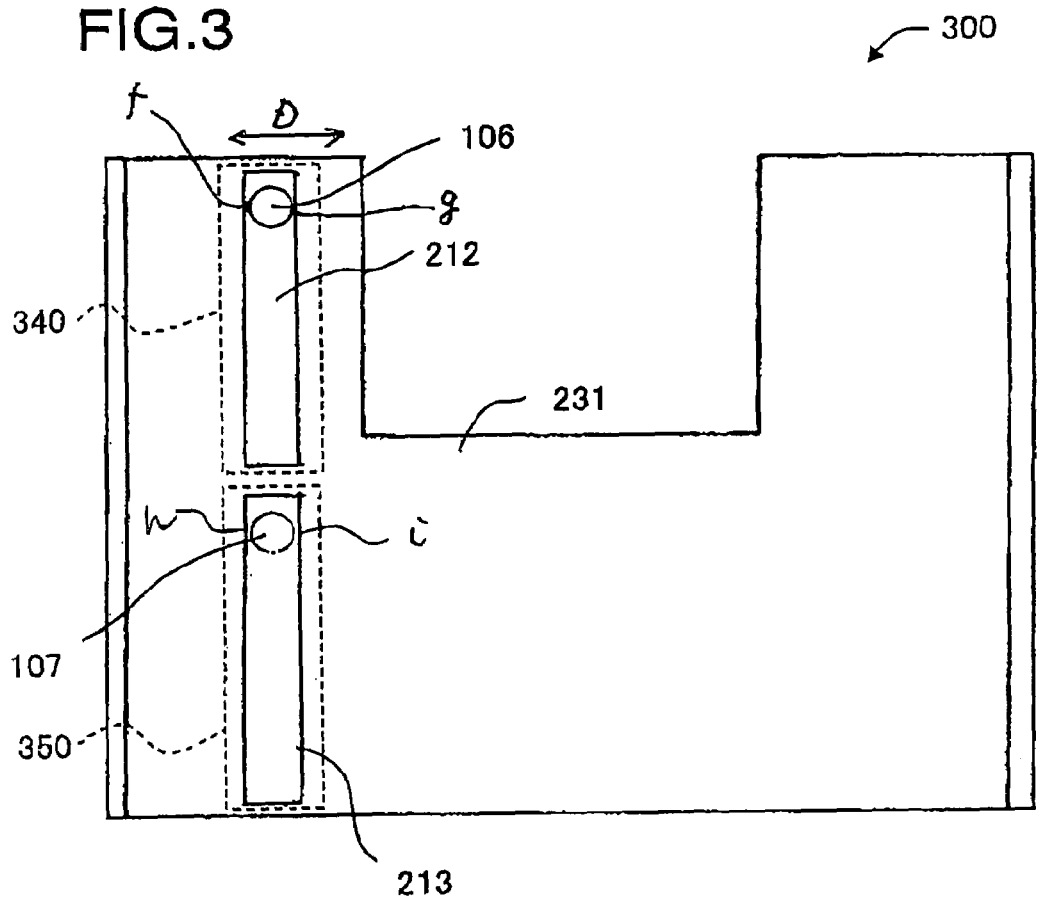
FIG. 3 is a plan view of the magnetic recording and reproduction apparatus in one example according to the present invention at a cassette mountable position.
Figure 5:
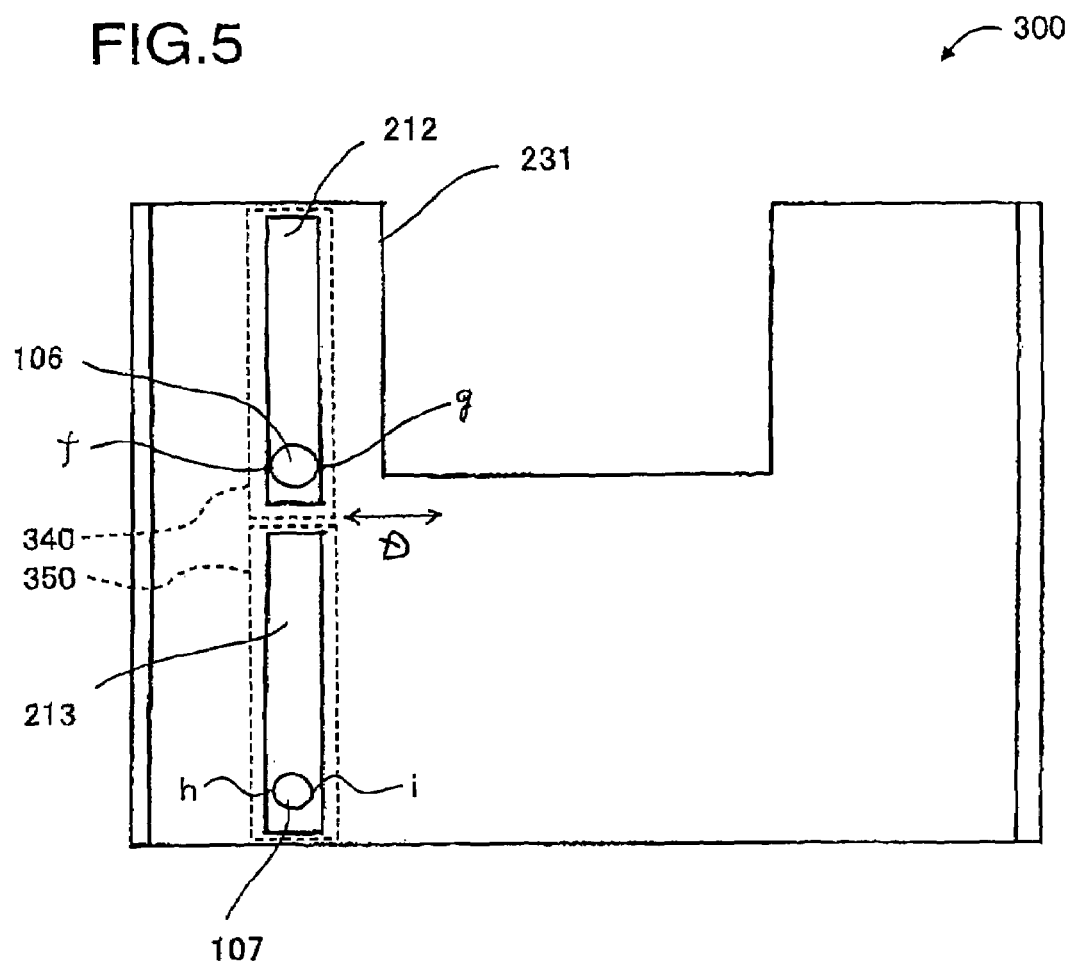
FIG. 5 is a plan view of the magnetic recording and reproduction apparatus in one example according to the present invention at a tape pull-out position.

The magnetic recording and reproduction apparatus 300 further includes a fourth guide section 340 which includes the fourth projection 106 and the fourth guide groove 212, and a fifth guide section 350 which includes the fifth projection 107 and the fifth guide groove 213 (see FIGS. 3 and 5).

The first guide section 310, the second guide section 320, the third guide section 330, the fourth guide section 340, and the fifth guide section 350 guide the sub chassis 200 to move relative to the main chassis 100.

Although omitted in FIGS. 1 and 2, the main chassis 100 and the sub chassis 200 are equipped with a tape pull-out member for pulling out the tape from the cassette 39 and winding the tape around the rotatable head cylinder 102, a tape driving member for driving the tape wound around the rotatable head cylinder 102 and the like.

FIG. 3 is a plan view of the magnetic recording and reproduction apparatus 300 at the cassette mountable position.

As shown in FIG. 3, at the cassette mountable position, the fourth projection 106 is contactable with the fourth guide groove 212 at two points f and g. The fourth projection 106 is positioned in a direction represented by arrow D (i.e., the direction from the left side section 120a to the right vertical section 120b of the main chassis 100 or vice versa, and the direction from the left side section 221a to the right vertical section 221b of the sub chassis 200 or vice versa).

Similarly, at the cassette mountable position, the fifth projection 107 is contactable with the fifth guide groove 213 at two points h and i. The fifth projection 106 is positioned in the width direction represented by arrow D.

In FIG. 4, part (a) is a left side view of the magnetic recording and reproduction apparatus 300, and part (b) is a right side view thereof, both at the cassette mountable position.

The sub chassis 200 and the main chassis 100 are engaged with each other. FIG. 4 shows the first projection 103, the second projection 104 and the third projection 105 as components provided on the main chassis 100. The entirety of the main chassis 100 is not shown.

As shown in part (a) of FIG. 4, at the cassette mountable position, the first projection 103 contacts the first guide groove 209 at two points x and y. The first projection 103 is positioned in both a moving direction represented by arrow A and a vertical direction represented by arrow B. The moving direction is the direction in which the first projection 103 is movable along the first guide groove 103. The vertical direction is perpendicular to the bottom section 130 of the main chassis 100 and also perpendicular to the bottom section 231 of the sub chassis 200.

The first projection 103 is contactable with the end 209a of the first guide groove 209 at the points x and y. The end 209a is formed such that the movement of the first projection 103 toward the end 209a is stopped by the contact with the two points x and y. The distance between the points x and y is shorter than the width of the first guide groove 209. The first guide groove 209 has the width in a direction perpendicular to the direction in which the first projection 103 is movable along the first guide groove 209. At the end 209a, the point x and the point y are on opposite sides to each other with respect to a line which is drawn by the center of gravity 103g of the first projection 103 by the movement of the first projection 103 along the first guide groove 209.

Similarly, as shown in part (b) of FIG. 4, at the cassette mountable position, the second projection 104 contacts the second guide groove 210 at two points x' and y'. The second projection 104 is positioned in both the moving direction represented by arrow A and the vertical direction represented by arrow B.

The second projection 104 is contactable with the end 210a of the second guide groove 210 at the points x' and y'. The end 210a is formed such that the movement of the second projection 104 toward the end 210a is stopped by the contact with the two points x' and y'. The distance between the points x' and y' is shorter than the width of the second guide groove 210. The second guide groove 210 has the width in a direction perpendicular to the direction in which the second projection 104 is movable along the second guide groove 210. At the end 210a, the point x' and the point y' are on opposite sides to each other with respect to a line which is drawn by the center of gravity 104g of the second projection 104 by the movement of the second projection 104 along the second guide groove 210.

As shown in part (b) of FIG. 4, the third projection 105 is contactable with the third guide groove 211 at two points d and e. The third projection 105 is positioned in the vertical direction of arrow C.

At the cassette mountable position, the tilt precision of the sub chassis 200 with respect to the main chassis 100 and the positional precision of the sub chassis 200 in the moving direction of arrow A with respect to the main chassis 100 are determined by the engagement of the first projection 103 and the first guide groove 209, the engagement of the second projection 104 and the second guide groove 210, and the engagement of the third projection 105 and the third guide groove 211.

FIG. 5 is a plan view of the magnetic recording and reproduction apparatus 300 at the tape pull-out position.

As shown in FIG. 5, at the tape pull-out position, the fourth projection 106 is contactable with the fourth guide groove 212 at two points f and g. The fourth projection 106 is positioned in the width direction represented by arrow D.

Similarly, at the tape pull-out position, the fifth projection 107 is contactable with the fifth guide groove 213 at two points h and i. The fifth projection 107 is positioned in the width direction represented by arrow D.

In FIG. 6, part (a) is a left side view of the magnetic recording and reproduction apparatus 300 and part (b) is a right side view thereof, both at the tape pull-out position.

The sub chassis 200 and the main chassis 100 are engaged with each other. FIG. 6 shows the first projection 103, the second projection 104 and the third projection 105 as components provided on the main chassis 100. The entirety of the main chassis 100 is not shown.

As shown in part (a) of FIG. 6, at the tape pull-out position, the first projection 103 contacts the first guide groove 209 at two points x and y. The first projection 103 is positioned in both the moving direction represented by arrow A and the vertical direction represented by arrow B.

The first projection 103 is contactable with the end 209b of the first guide groove 209 at the points x and y. The end 209b is formed such that the movement of the first projection 103 toward the end 209b is stopped by the contact with the two points x and y. The distance between the points x and y is shorter than the width of the first guide groove 209. At the end 209b, the point x and the point y are on opposite sides to each other with respect to a line which is drawn by the center of gravity 103g of the first projection 103 by the movement of the first projection 103 along the first guide groove 209.

Similarly, as shown in part (b) of FIG. 6, at the tape pull-out position, the second projection 104 contacts the second guide groove 210 at two points x' and y'. The second projection 104 is positioned in both the moving direction represented by arrow A and the vertical direction represented by arrow B.

The second projection 104 is contactable with the end 210b of the second guide groove 210 at the points x' and y'. The end 210b is formed such that the movement of the second projection 104 toward the end 210b is stopped by the contact with the two points x' and y'. The distance between the points x' and y' is shorter than the width of the second guide groove 210. At the end 210b, the point x' and the point y' are on opposite sides to each other with respect to a line which is drawn by the center of gravity 104g of the second projection 104 by the movement of the second projection 104 along the second guide groove 210.

As shown in part (b) of FIG. 6, at the tape pull-out position, the third projection 105 contacts the third guide groove 211 at two points d and e. The third projection 105 is positioned in the vertical direction of arrow C.

At the tape pull-out position also, the tilt precision of the sub chassis 200 with respect to the main chassis 100 and the positional precision of the sub chassis 200 in the moving direction of arrow A with respect to the main chassis 100 are determined by the engagement of the first projection 103 and the first guide groove 209, the engagement of the second projection 104 and the second guide groove 210, and the engagement of the third projection 105 and the third guide groove 211.

Hereinafter, the main chassis 100 will be described in detail.

Figure 7:
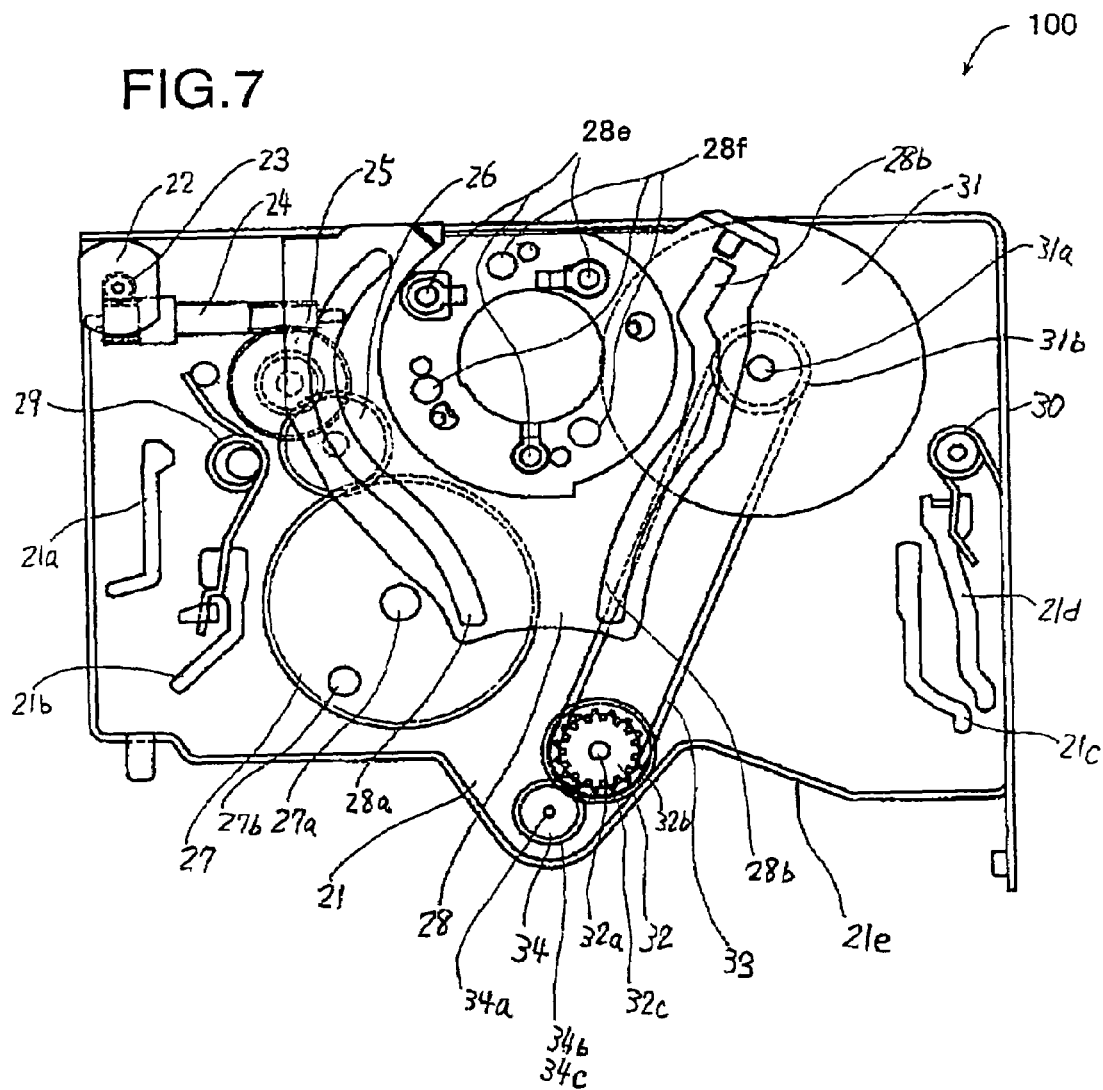
FIG. 7 is a plan view of the main chassis of the magnetic recording and reproduction apparatus in one example according to the present invention.

FIG. 7 is a plan view of the main chassis 100.

The main chassis 100 has, for example, the following elements provided thereon: a capstan 31 provided on the bottom section 130, a capstan shaft 31a provided on the capstan 31, a drive gear 32, a timing belt 33, and a center gear 34.

Figure 9:
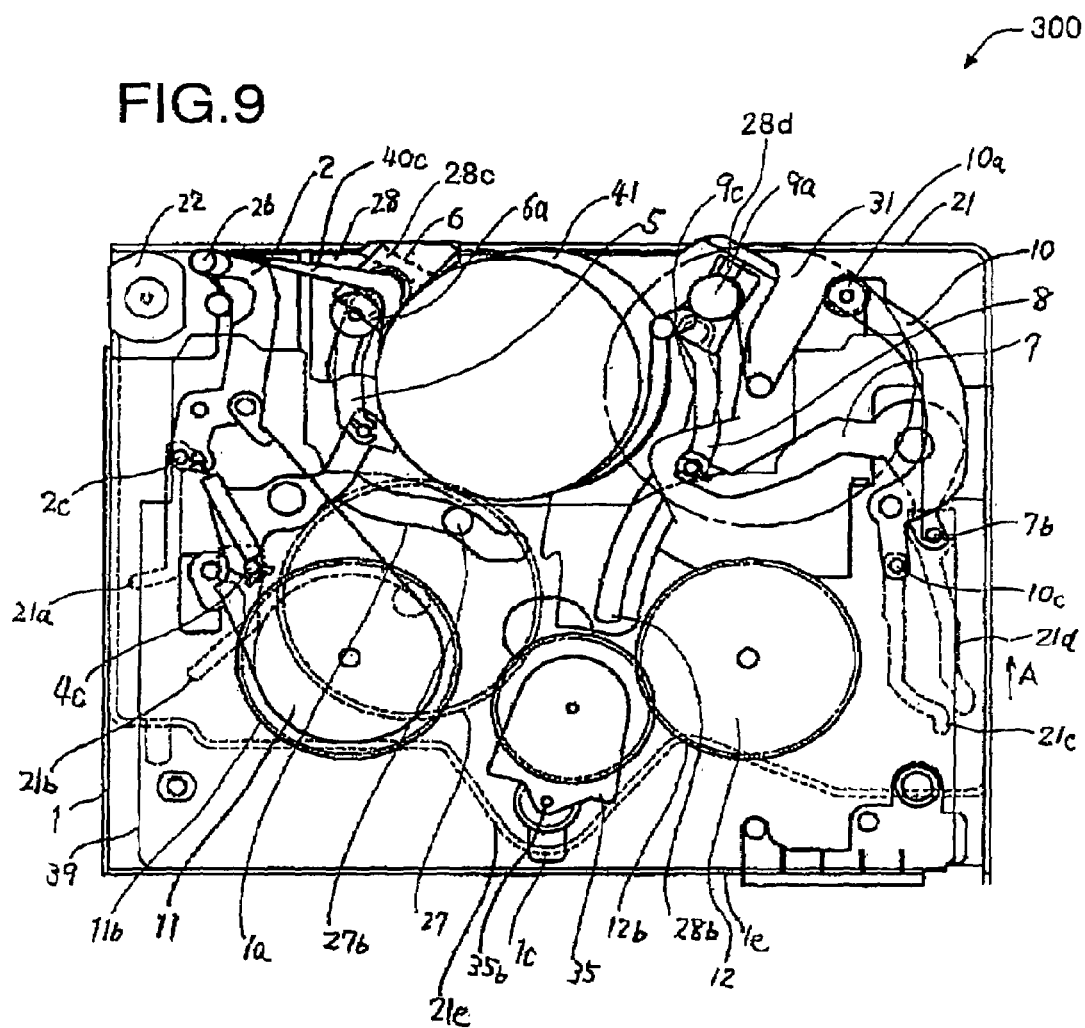
FIG. 9 is a plan view of the magnetic recording and reproduction apparatus in one example according to the present invention at the tape pull-out position.
Figure 10:
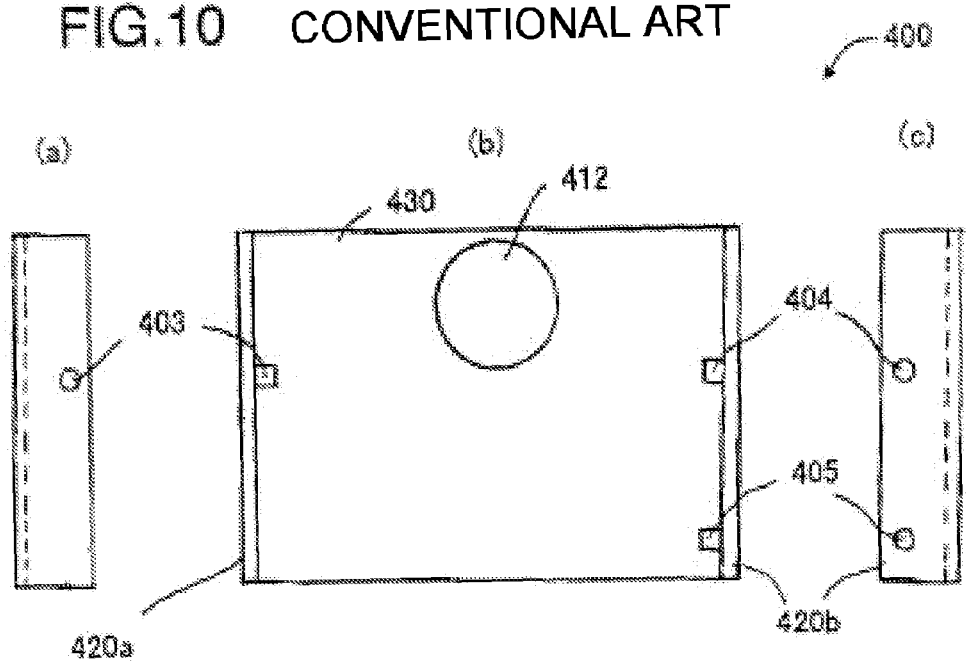
FIG. 10 shows a left side view, a plan view, and a right side view of a main chassis of a conventional magnetic recording and reproduction apparatus.
Figure 11:
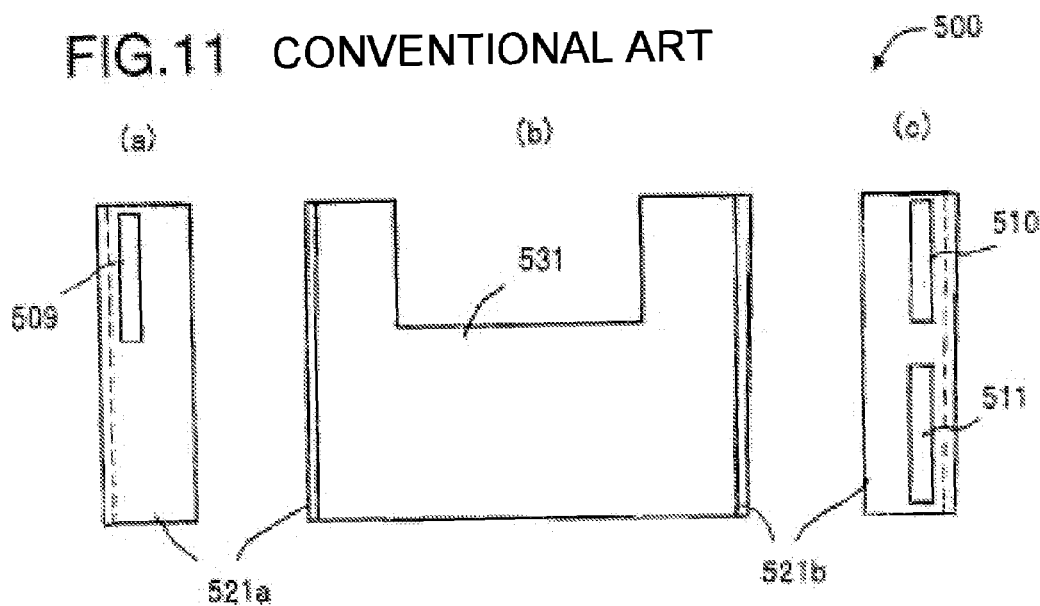
FIG. 11 shows a left side view, a plan view, and a right side view of a sub chassis of the conventional magnetic recording and reproduction apparatus.
Figure 12:
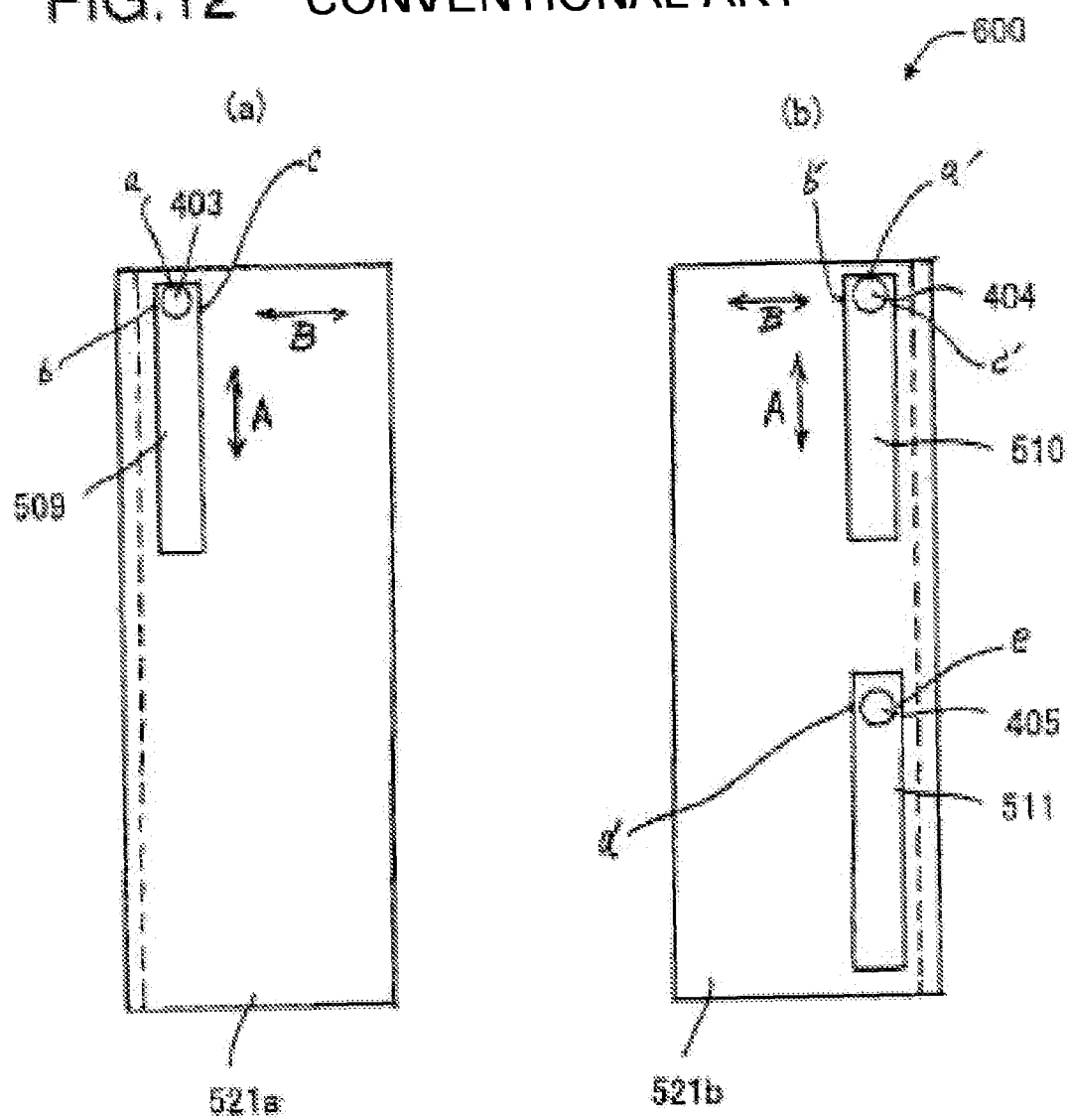
FIG. 12 shows a left side view and a right side view of the conventional magnetic recording and reproduction apparatus at the cassette mountable position.

The bottom section 130 of the main chassis 100 has four cam grooves 21a, 21b, 21c and 21d formed therein. A portion of the bottom section 103 of the main chassis 100 along a forward end 21e is largely cut out on both sides of the drive gear 32 and the center gear 34 toward the rotatable head cylinder 102 (FIG. 9). The forward end 21e has an L-shaped cross-section in the thickness direction of the magnetic recording and reproduction apparatus 300. The forward end 21e has a certain thickness.

A motor 22 is rotatable forward and backward. A rotation force of the motor 22 is conveyed to a mode gear 27 via a motor worm 23, a connection worm 24, and gears 25 and 26. The mode gear 27 is rotatable with a support 27a as the center of rotation. A sub chassis driving pin 27b is provided on a top surface of the mode gear 27. The sub chassis driving pin 27b is engaged with the sub chassis 200 (FIG. 1), so that the sub chassis 200 is movable relative to the main chassis 100.

A cylinder base 28 is secured to the main chassis 100 via three cylinder screw holes 28e. The rotatable head cylinder 102 (FIG. 9) is provided on a cylinder base 28, and is secured with three cylinder screw holes 28f which are screwed from a rear surface of the cylinder base 28.

Guide grooves 28a and 28b are respectively provided for guiding the S boat 6 and the T boat 9 mounted on the bottom section 231 of the sub chassis 200 when the S boat 6 and the T boat 9 pull out the magnetic tape from the cassette 39. Elastic twisted coil springs 29 and 30 are secured on the main chassis 100 in the state of being provided with a pressure by a prescribed force.

The capstan shaft 31a rotates in the state where the pinch roller (not shown) presses the tape to the capstan shaft 31a, thereby driving the tape. A capstan gear 31b is integrally provided with the capstan 31.

The drive gear 32 is supported at an axis thereof by a rotation shaft 32a provided on the main chassis 100. The drive gear 32 includes an upper gear 32b and a lower gear 32a. The timing belt 33 is extended around the upper gear 32b and the capstan gear 31b integral with the capstan 31.

The center gear 34 is supported at an axis thereof by a rotation shaft 34a provided on the main chassis 100. The center gear 34 includes an upper gear 34b and a lower gear 34c. The lower gear 32c of the drive gear 32 and the lower gear 34c of the center gear 34 are engaged with each other.

Figure 8:
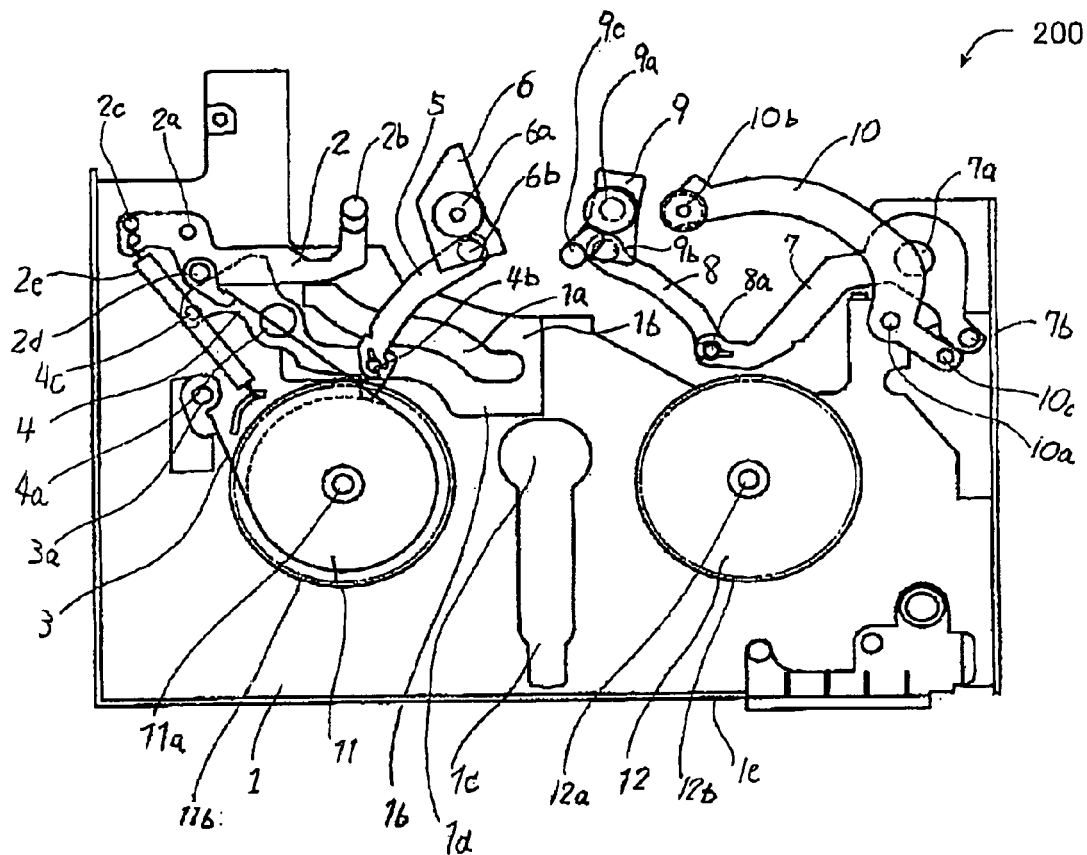
FIG. 8 is a plan view of the sub chassis of the magnetic recording and reproduction apparatus in one example according to the present invention.

FIG. 8 is a plan view of the sub chassis 200.

The bottom section 231 of the sub chassis 200 has, for example, the following provided thereon: four tape pull-out members 2, 6, 9 and 10, a supply reel stand (hereinafter, referred to also as an "S reel stand") 11 rotatably supported on the bottom section 231 of the sub chassis 200, and a take-in reel stand (hereinafter, referred to also as a "T reel stand") 12 rotatably supported on the bottom section 231 of the sub chassis 200. The four tape pull-out members 2, 6, 9 and 10 will also be referred to as a TR arm 2, an S boat 6, a T boat 9, and a T3 arm 10.

The cassette 39 (FIG. 9) is mountable on the sub chassis 200. The cassette 39 is mounted from a forward end 1e of the bottom section 231 of the sub chassis 200. The cassette 39 has a general structure including a magnetic tape, a supply reel, a take-in reel, and a reel lock member for locking the supply reel and the take-in reel.

The S reel stand 11 is engageable with the supply reel of the cassette, and the T reel stand 12 is engageable with the take-in reel of the cassette.

The TR arm 2 is pivotably supported about a support 2a on the bottom section 231 of the sub chassis 200. A TR post 2b is provided on a top surface of one end of the TR arm 2, and a TR arm driving pin 2c is provided on a bottom surface of other end of the TR arm 2.

The T3 arm 10 is pivotably supported about a support 10a on the sub chassis 200. A T3 post 10b is provided on a top surface of one end of the T3 arm 10, and a T3 arm driving pin 10c is provided on a bottom surface of other end of the T3 arm 10.

An S arm 4 is pivotably supported about a support 4a on the bottom section 231 of the sub chassis 200. An S arm driving pin 4c is provided on a bottom surface of one end of the S arm 4, and an S link pin 4b is provided on a top surface of the other end of the S arm 4.

An S link 5 is pivotably attached to the S link pin 4b at one end of the S link 5. The S boat 6 is pivotably attached to the other end of the S link 5 via a boss 6b.

A T arm 7 has substantially the same structure as that of the S arm 4. Specifically, the T arm 7 is supported to be pivotable about a support 7a on the bottom section 231 of the sub chassis 200. A T arm driving pin 7b is provided on a bottom surface of one end of the T arm 7, and a T link pin 8a is provided on a top surface of the other end of the T arm 7.

A T link 8 is pivotably attached to the T link pin 8a at one end of the T link S. The T boat 9 is pivotably attached to the other end of the T link 8 via a boss 9b.

The S boat 6 has an S roller post 6a provided thereon for guiding the magnetic tape, and the T boat 9 has a T roller post 9a and a T1 post 9c provided thereon for guiding the magnetic tape.

As described above, all the tape pull-out members 2, 6, 9 and 10 are provided on the sub chassis 200.

The S reel stand 11 and the T reel stand 12 are supported so as to be rotatable about a shaft 11a and a shaft 12a, respectively. A gear portion 11b is provided around an outer circumference of the S reel stand 11, and a gear portion 12b is provided around an outer circumference of the T reel stand 12. The S reel stand 11 is engaged with a supply reel of the cassette 39 (FIG. 9) and the T reel stand 12 is engaged with a take-in reel of the cassette 39 when the cassette is mounted on the sub chassis 200. This engagement allows the magnetic tape to be taken in.

A brake band (TR band) 3 for controlling the tension of the magnetic tape while the magnetic tape is running is wound around the S reel stand 11. One end of the TR band 3 is supported about a pivotable member 2d of the TR arm 2, and the other end of the TR band 3 is supported about a pivotable member 3a on the sub chassis 200. While the magnetic tape is running, a load acts on the S reel stand 11 via the TR band 3 by a force of a TR spring 2e attached to the TR arm 2.

In a sub chassis adjusting plate 1b, a groove 1a is formed. The sub chassis adjusting plate 1b is secured to the sub chassis 200 by a screw (not shown). The sub chassis 200 has a lengthy hole 1c and a circular hole 1d communicated with the lengthy hole 1c at an end of the lengthy hole 1c opposite to the forward end 1e.

FIG. 9 is a plan view of the magnetic recording and reproduction apparatus 300 at the tape pull-out position.

The magnetic recording and reproduction apparatus 300 includes the sub chassis 200 on which the cassette 39 is mountable and the main chassis 100 having the rotatable head cylinder 102 mounted thereon.

The sub chassis 200 accommodates the supply reel stand 11 and the take-in reel stand 12 respectively engageable with the supply reel and the take-in reel in the cassette 39. The main chassis 100 accommodates the capstan 31 for driving the magnetic tape 40.

The idler 35 is supported by the main chassis 100 at an axis thereof, and is driven by the rotation of the capstan shaft 31a. The idler 35 is engaged with the supply reel stand 11 and the take-in reel stand 12 to rotate the supply reel stand 11 and the take-in reel stand 12.

At the tape pull-out position, the tape pull-out members 2, 6, 9 and 10 pull out the magnetic tape 40 from the cassette 39 accommodating the supply reel and the take-in reel, and winds the magnetic tape 40 around the rotatable head cylinder 102 over a prescribed angle. Thus, at least one of information recording to, and information reproduction from, the magnetic tape 40 is performed.

The main chassis 100, the sub chassis 200, and the magnetic recording and reproduction apparatus 300 described in detail with reference to FIGS. 7, 8 and 9 merely represent one example of the present invention. The present invention is not limited to the structure shown in FIGS. 7, 8 and 9.

In FIGS. 7, 8 and 9, the guide grooves and the projections are omitted for the sake of simplicity.

As described above, according to the present invention, the main chassis 100 has the first projection 103, the second projection 104, the third projection 105, the fourth projection 106, and the fifth projection 107. The sub chassis 200 has the first guide groove 209, the second guide groove 210, the third guide groove 211, the fourth guide groove 212, and the fifth guide groove 213. In more detail, the first projection 103, the second projection 104, and the third projection 105 are provided on vertical surfaces of the main chassis 100. The first guide groove 209, the second guide groove 210 and the third guide groove 211 are provided in vertical surfaces of the sub chassis 200. The first guide groove 209 has the two ends 209a and 209b, between which the first projection 103 is movable along the first guide groove 209. At each of the ends 209a and 209b, the first projection 103 is contactable with the first guide groove 209 at two points x and y. The distance between the points x and y is shorter than the width of the first guide groove 209. The second guide groove 210 has the two ends 210a and 210b, between which the second projection 104 is movable along the second guide groove 210. At each of the ends 210a and 210b, the second projection 104 is contactable with the second guide groove 210 at two points x' and y'. The distance between the points x' and y' is shorter than the width of the second guide groove 210. According to the present invention, the sub chassis 200 can be positioned with respect to the main chassis 100 by the above-described simple structure.

In the above example, the projections are provided on the main chassis 100 and the guide grooves are provided in the sub chassis 200. The present invention is not limited to such a structure. The projections may be provided on the sub chassis 200 and the guide grooves may be provided in the main chassis 100.

In the above example, the projections have a circular cross-section. The present invention is not limited to this. The projections may have an elliptical cross-section or a quadrangular cross-section.

In the above example, both ends of the first and second guide grooves 103 and 104 between which the respective projections are movable are V-shaped. The present invention is not limited to this. Both ends of one of the first and second guide grooves 103 and 104 may be V-shaped. One end of the first guide groove 103 and one end of the second guide groove 103 may be V-shaped. At least one of the ends of the first and second guide grooves 103 and 104 may be V-shaped.

In the above example, the ends of the first and second guide grooves 103 and 104 are V-shaped. The present invention is not limited to this. The effect of the present invention is provided by the structure, in which the guide groove has two ends between which a projection is movable, the projection is contactable with at least one of the two ends at two points and the at least one end is formed such that the movement of the projection toward the at least one end is stopped by the contact with the two points, and the two points have a distance therebetween which is shorter than a width of the guide groove in a direction perpendicular to the direction in which the sub chassis is movable.

According to the present invention, a guide groove has two ends between which a projection is movable. The projection is contactable with at least one of the two ends at two points and the at least one end is formed such that the movement of the projection toward the at least one end is stopped by the contact with the two points, and the two points have a distance therebetween which is shorter than a width of the guide groove in a direction perpendicular to the direction in which the sub chassis is movable. Thus, the present invention provides a magnetic recording and reproduction apparatus in which the sub chassis can be positioned with respect to the main chassis with high precision by a simple structure.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus for recording information to, and/or reproducing information from, a magnetic tape accommodated in a cassette, the magnetic recording and reproduction apparatus comprising:
   a main chassis on which a rotatable head cylinder for recording information to, and/or reproducing information from, the magnetic tape is mounted;
   a sub chassis on which the cassette is mountable, the sub chassis being movable relative to the main chassis; and
   a first guide section for guiding the sub chassis to move relative to the main chassis;
   wherein:
   the first guide section includes:
      a first guide groove provided in one of the main chassis and the sub chassis, the first guide groove extending in a direction in which the sub chassis is movable relative to the main chassis; and
      a first projection provided on the other of the main chassis and the sub chassis, the first projection being engageable with the first guide groove and movable along the first guide groove; and
   the first guide groove has two opposing sidewalls and two ends between which the first projection is movable, the first projection is contactable with at least one of the two ends at two points on said opposing sidewalls oppsite to each other with respect to a line which is drawn by a center of gravity of the first projection by the movement of the first projection along the first guide groove and the at least one end is formed such that the movement of the first projection toward the at least one end is stopped by the contact with the two points, and the two points have a distance therebetween which is shorter than a width of the first guide groove in a direction perpendicular to the direction in which the sub chassis is movable.

2. A magnetic recording and reproduction apparatus according to claim 1, further comprising:
   a second guide section for guiding the sub chassis to move relative to the main chassis;
   a third guide section for guiding the sub chassis to move relative to the main chassis;
   wherein:
   the second guide section includes:
      a second guide groove provided in one of the main chassis and the sub chassis, the second guide groove extending in the direction in which the sub chassis is movable relative to the main chassis; and
      a second projection provided on the other of the main chassis and the sub chassis, the second projection being engageable with the second guide groove and movable along the second guide groove; and
   the third guide section includes:
      a third guide groove provided in one of the main chassis and the sub chassis, the third guide groove extending in the direction in which the sub chassis is movable relative to the main chassis; and
      a third projection provided on the other of the main chassis and the sub chassis, the third projection being engageable with the third guide groove and movable along the third guide groove;
   the main chassis includes a bottom section, a first side section vertical to the bottom section, and a second side section vertical to the bottom section and facing the first side section;
   the sub chassis includes a bottom section, a first side section vertical to the bottom section, and a second side section vertical to the bottom section and facing the first side section;
   the first guide section is provided on the first side sections of the main chassis and the sub chassis;
   the second guide section and the third guide section are each provided on the second side sections of the main chassis and the sub chassis; and
   the second guide groove has two ends between which the second projection is movable, the second projection is contactable with at least one of the two ends at two points and the at least one end is formed such that the movement of the second projection toward the at least one end is stopped by the contact with the two points, and the two points have a distance therebetween which is shorter than a width of the second guide groove in a direction perpendicular to the direction in which the sub chassis is movable.

3. A magnetic recording and reproduction apparatus according to claim 2, further comprising:
- a fourth guide section for guiding the sub chassis to move relative to the main chassis; and
- a fifth guide section for guiding the sub chassis to move relative to the main chassis;

wherein:

the fourth guide section includes:
- a fourth guide groove provided in one of the main chassis and the sub chassis, the fourth guide groove extending in the direction in which the sub chassis is movable relative to the main chassis; and
- a fourth projection provided on the other of the main chassis and the sub chassis, the fourth projection being engageable with the fourth guide groove and movable along the fourth guide groove; and the fifth guide section includes:
- a fifth guide groove provided in one of the main chassis and the sub chassis, the fifth guide groove extending in the direction in which the sub chassis is movable relative to the main chassis; and
- a fifth projection provided on the other of the main chassis and the sub chassis, the fifth projection being engageable with the fifth guide groove and movable along the fifth guide groove; and the fourth guide section and the fifth guide section are each provided on the bottom sections of the main chassis and the sub chassis.

4. A magnetic recording and reproduction apparatus according to claim 1, wherein at least one of the two ends of the first guide groove is V-shaped.

* * * * *